(12) United States Patent
Kurihara

(10) Patent No.: US 11,919,350 B2
(45) Date of Patent: Mar. 5, 2024

(54) SPRING GUIDE AND SUSPENSION DEVICE

(71) Applicant: KYB Corporation, Tokyo (JP)

(72) Inventor: Kenta Kurihara, Aichi (JP)

(73) Assignee: KYB CORPORATION, Tokyo (JP)

( * ) Notice: Subject to any disclaimer, the term of this patent is extended or adjusted under 35 U.S.C. 154(b) by 358 days.

(21) Appl. No.: 17/311,549

(22) PCT Filed: Dec. 4, 2019

(86) PCT No.: PCT/JP2019/047515
§ 371 (c)(1),
(2) Date: Jun. 7, 2021

(87) PCT Pub. No.: WO2020/129653
PCT Pub. Date: Jun. 25, 2020

(65) Prior Publication Data
US 2022/0024272 A1 Jan. 27, 2022

(30) Foreign Application Priority Data
Dec. 17, 2018 (JP) .................................. 2018-235807

(51) Int. Cl.
*B60G 15/06* (2006.01)
*B60G 11/16* (2006.01)
*F16F 1/12* (2006.01)
*F16F 9/54* (2006.01)
*F16F 9/58* (2006.01)

(52) U.S. Cl.
CPC ............ *B60G 15/063* (2013.01); *B60G 11/16* (2013.01); *F16F 1/126* (2013.01); *F16F 9/54* (2013.01); *F16F 9/58* (2013.01); *B60G 2204/12422* (2013.01)

(58) Field of Classification Search
None
See application file for complete search history.

(56) References Cited

U.S. PATENT DOCUMENTS

| 2016/0023529 A1* | 1/2016 | Wilkin ...................... F16F 1/12 267/221 |
| 2016/0185177 A1* | 6/2016 | Kaneko ................ B60G 15/063 267/221 |
| 2017/0274719 A1 | 9/2017 | Broeckx et al. |

FOREIGN PATENT DOCUMENTS

| DE | 102016200307 A1 | | 1/2017 |
| JP | 2002137254 A | * | 5/2002 |
| JP | 200727661 A | | 10/2007 |
| JP | 2017-172801 A | | 9/2017 |

* cited by examiner

*Primary Examiner* — Melanie Torres Williams
(74) *Attorney, Agent, or Firm* — Rabin & Berdo, P.C.

(57) ABSTRACT

A spring guide includes: a base portion configured to support a coil spring; and an opening portion provided so as to penetrate through the base portion, the opening portion being configured such that a shock absorber is inserted into the opening portion, the opening portion is provided with: protruded portions protruding out from an inner circumferential surface of the opening portion, the protruded portions being configured to support the shock absorber; and a recessed portion recessed in the inner circumferential surface of the opening portion, a plurality of the protruded portions are arranged along a circumferential direction of the opening portion, and a gate trace of an injection mold is formed in the recessed portion.

8 Claims, 9 Drawing Sheets

SPRING GUIDE AND SUSPENSION DEVICE

TECHNICAL FIELD

The present invention relates to a spring guide and a suspension device.

BACKGROUND ART

There is a known strut type dumper (suspension device) in which a coil spring, which is disposed around a shock absorber device (a shock absorber) so as to be concentric therewith, is provided (see JP2017-172801A). The coil spring is arranged between an upper spring seat and a lower spring seat of the dumper. A hole (an opening portion) for receiving a housing of the shock absorber device is provided in the lower spring seat (a spring guide).

SUMMARY OF INVENTION

When the lower spring seat is formed by an injection molding, if a gate trace (a burr) of an injection mold is formed on an inner circumferential surface of the hole, as the shock absorber device is to be inserted into the hole of the lower spring seat, there is a risk in that the gate trace comes into contact with the housing of the shock absorber device. As a result, there is a problem in that the insertion of the shock absorber device into the hole of the lower spring seat takes time and labor.

An object of the present invention is to improve an insertability of a shock absorber into an opening portion of a spring guide.

According to an aspect of the present invention, a spring guide attached to an outer circumferential surface of a shock absorber provided between a vehicle body and a wheel and configured to support a coil spring for elastically supporting the vehicle body, the spring guide includes: a base portion configured to support the coil spring; and an opening portion provided so as to penetrate through the base portion, the opening portion being configured such that the shock absorber is inserted into the opening portion, the opening portion is provided with: protruded portions protruding out from an inner circumferential surface of the opening portion, the protruded portions being configured to support the shock absorber; and a recessed portion recessed in the inner circumferential surface of the opening portion, a plurality of the protruded portions are arranged along a circumferential direction of the opening portion, and a gate trace of an injection mold is formed in the recessed portion.

DESCRIPTION OF EMBODIMENTS

A spring guide 100 and a suspension device 10 according to an embodiment of the present invention will be described with reference to the drawings.

Figure 1:
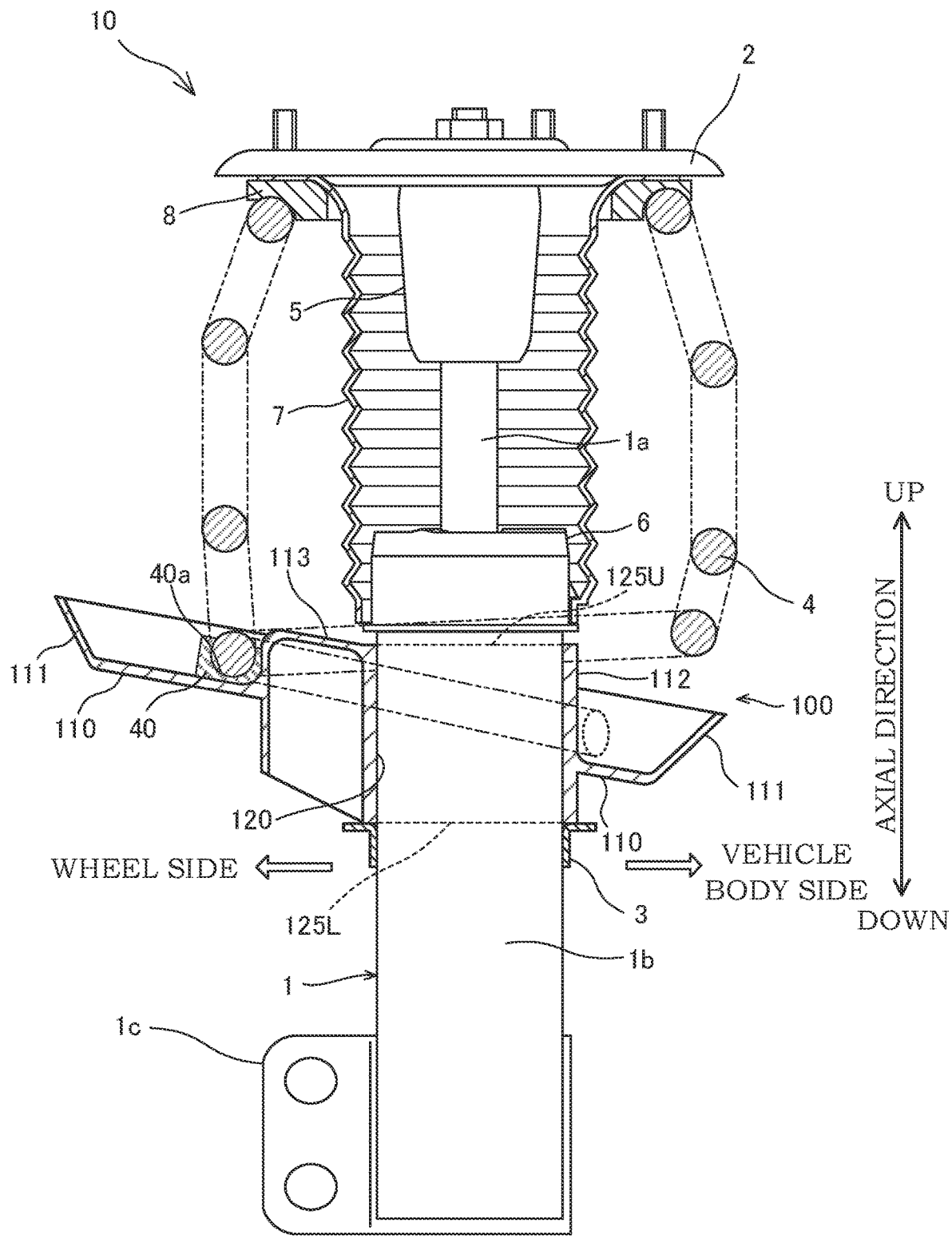
FIG. 1 is a partial cross-sectional view of a suspension device according to an embodiment of the present invention.

As shown in FIG. 1, the suspension device 10 is a device for stably suspending a vehicle body by being installed on an automobile (not shown), by positioning a wheel (not shown), and by absorbing impacts and vibrations received from a road surface during a travelling of a vehicle by generating a damping force.

The suspension device 10 is provided with: a strut type shock absorber 1 that is provided between the vehicle body and the wheel; an upper mount 2 that is attached to a tip end of a piston rod (hereinafter, referred to as a rod) 1a of the shock absorber 1; the spring guide 100 that is attached to an outer circumferential surface of a cylinder 1b of the shock absorber 1; a coil spring 4 that is provided between the spring guide 100 and the upper mount 2 and that elastically supports the vehicle body; a bump stopper 5 that is fitted to the rod 1a and that restricts a stroke of the shock absorber 1 in a contracting direction; a bump cap 6 serving as a cap member that is fitted to an end portion of the cylinder 1b on the side of the rod 1a; and a dust boot 7 serving as a tubular cover member that protects the rod 1a.

A bracket 1c for linking a hub carrier (not shown) that holds the wheel and the shock absorber 1 is provided on an end portion of the cylinder 1b on the opposite side from the rod 1a. For the sake of convenience of description, the vertical direction is defined as shown in FIG. 1, in which the upper mount 2 side corresponds to the upper side of the suspension device 10 and the bracket 1c side corresponds to the lower side of the suspension device 10. The vertical direction of the suspension device 10 corresponds to the axial direction (the center axial direction) of the suspension device 10, that is, the extension-contraction direction of the shock absorber 1. In addition, the radial direction of the suspension device 10 (the radial direction of the shock absorber 1) intersects with the axial direction of the suspension device 10 perpendicularly.

The shock absorber 1 is assembled to the vehicle by being linked to the vehicle body via the upper mount 2 and by being linked to the hub carrier with the bracket 1c. The shock absorber 1 configured as described above is configured so as to generate a damping force when the rod 1a is moved with respect to the cylinder 1b in the axial direction (the vertical direction in FIG. 1). The suspension device 10 quickly attenuates vibrations of the vehicle body by the damping force generated by the shock absorber 1.

The coil spring 4 is clamped between the upper mount 2 and the spring guide 100 in a compressed state, thereby biasing the shock absorber 1 in the extending direction. A rubber seat 8 is provided between the upper mount 2 and the coil spring 4. With such a configuration, the upper mount 2 and the coil spring 4 are prevented from coming into direct contact with each other. An arc-shaped rubber seat 40 is provided between the spring guide 100 and the coil spring 4. With such a configuration, the spring guide 100 and the coil spring 4 are prevented from coming into direct contact with each other.

Figure 2:
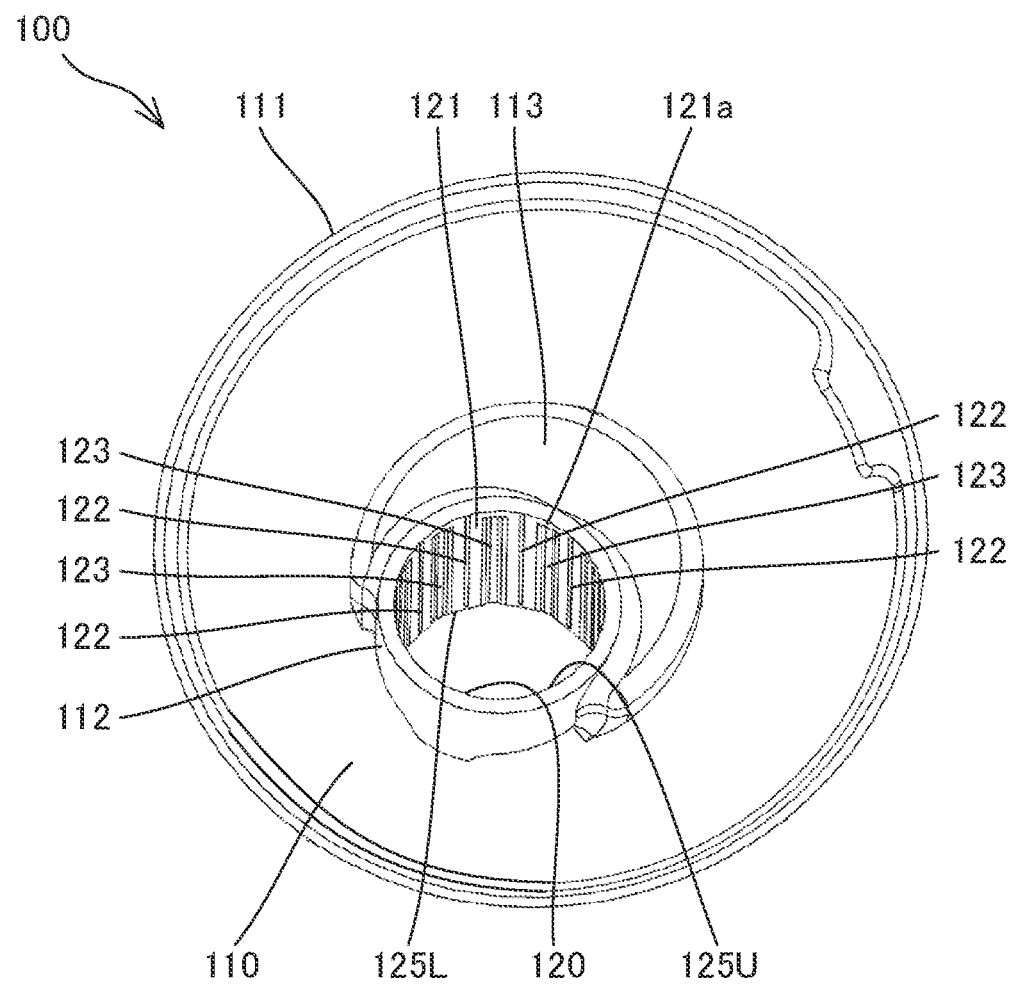
FIG. 2 is a perspective view of a spring guide according to the embodiment of the present invention.

As shown in FIGS. 1 and 2, the spring guide 100 is a bowl-shaped resin member that is fixed to an outer circumference of the cylinder 1b. The spring guide 100 is provided with: a disc-shaped base portion 110 for supporting the coil spring 4; a side wall 111 that extends upwards (towards the upper mount 2 side) from an outer edge of the base portion 110; an opening portion 120 that is provided so as to penetrate through the base portion 110 in the axial direction of the suspension device 10 (in the vertical direction) and into which the cylinder 1b of the shock absorber 1 is inserted; a cylindrical-shaped barrel portion 112 that is formed so as to project upwards and downwards from the base portion 110 and so as to surround the opening portion 120; and a hub 113 having a bottomed cylindrical shape.

An attachment region for attaching the rubber seat 40 is formed around the hub 113 on the base portion 110. A position restriction portion (not shown) for restricting the position of the rubber seat 40 is provided on the base portion 110. The rubber seat 40 is formed of a material having an elasticity, such as rubber. A seating portion 40a, which is formed such that the cross section of the seating portion 40a is curved so as to follow the cross-sectional shape of the coil spring 4, is provided on the rubber seat 40 (see FIG. 1). In the spring guide 100, in order to reduce the weight and to remove water accumulated in the base portion 110, a plurality of through holes are formed (not shown).

The circular opening portion 120 is formed by an inner circumference of the barrel portion 112 that projects from the base portion 110 in the axial direction. As shown in FIG. 1, the opening portion 120 is formed so as to be positioned eccentric towards the vehicle body from the center of the spring guide 100 when the spring guide 100 is fixed to the outer circumference of the cylinder 1b. A metallic support ring 3 is fixed to the outer circumference of the cylinder 1b by being welded. The spring guide 100 is fixed to the outer circumference of the cylinder 1b by fitting the opening portion 120 to the outer circumference of the cylinder 1b such that a lower end portion of the barrel portion 112 of the spring guide 100 is supported by the support ring 3. The fitting between the cylinder 1b and the opening portion 120, specifically, the fitting between the cylinder 1b and ribs 122 formed in the opening portion 120 (see FIGS. 2 to 4B) may be "a clearance fitting" or "an interference fitting". By employing "the interference fitting", rattling between the opening portion 120 and the cylinder 1b is prevented, and so, it is possible to prevent generation of noise due to the rattling. In addition, it is also possible to improve responsibility of the operation of the suspension device 10.

The spring guide 100 is attached to the cylinder 1b by fitting the spring guide 100 to the cylinder 1b from the top so as to come into contact with the support ring 3. In other words, the cylinder 1b is inserted from a lower opening end 125L of the opening portion 120 of the spring guide 100. That is to say, the lower opening end 125L is an entrance through which the cylinder 1b is inserted, and an upper end portion of the cylinder 1b projects out from an upper opening end 125U that is an opening end on the opposite side of the lower opening end 125L.

A shape of the opening portion 120 having a circular inner circumferential surface will be specifically described with reference to FIGS. 2 to 4B. As shown in FIGS. 2 to 4B, the opening portion 120 is provided with: ribs 122 serving as protruded portions that protrude radially inward from an inner circumferential surface 121 of the opening portion 120; and grooves 123 serving as recessed portions that are recessed radially outward from the inner circumferential surface 121 of the opening portion 120. The ribs 122 function as support portions that support the outer circumferential surface of the cylinder 1b of the shock absorber 1, and the grooves 123 function as receiving portions that receive a gate trace (a burr) 130 of an injection mold 150 (see FIGS. 5 to 7) formed by an injection molding.

The ribs 122 are, for example, formed such that the cross-sectional shape thereof has a rounded trapezoidal shape or a semi-circular shape, and the ribs 122 come into line contact with the outer circumferential surface of the cylinder 1b. A plurality of ribs 122 are arranged at equal intervals along the circumferential direction of the opening portion 120. Therefore, the spring guide 100 is positioned such that the center axis of the opening portion 120 coincides with the center axis of the cylinder 1b.

The grooves 123 are, for example, formed such that the cross-sectional shape thereof has the trapezoidal shape. The grooves 123 each has a flat bottom surface 123a and inclined surfaces 123b that respectively extend toward the inner circumferential surface 121 from both ends of the bottom surface 123a in the circumferential direction. A plurality of grooves 123 are arranged at equal intervals along the circumferential direction of the opening portion 120. With such a configuration, compared with a case in which a single groove 123 is provided, it is possible to reduce the weight of the spring guide 100, and at the same time, it is possible to achieve a balanced strength in the circumferential direction.

The ribs 122 are each provided so as to extend linearly along the axial direction of the opening portion 120 (in other words, the axial direction of the suspension device 10). Similarly, the grooves 123 are each provided so as to extend linearly along the axial direction of the opening portion 120 (in other words, the axial direction of the suspension device 10). In this embodiment, the ribs 122 and the grooves 123 are alternately arranged at equal intervals. That is to say, the groove 123 is arranged between adjacent ribs 122.

Figure 4A:
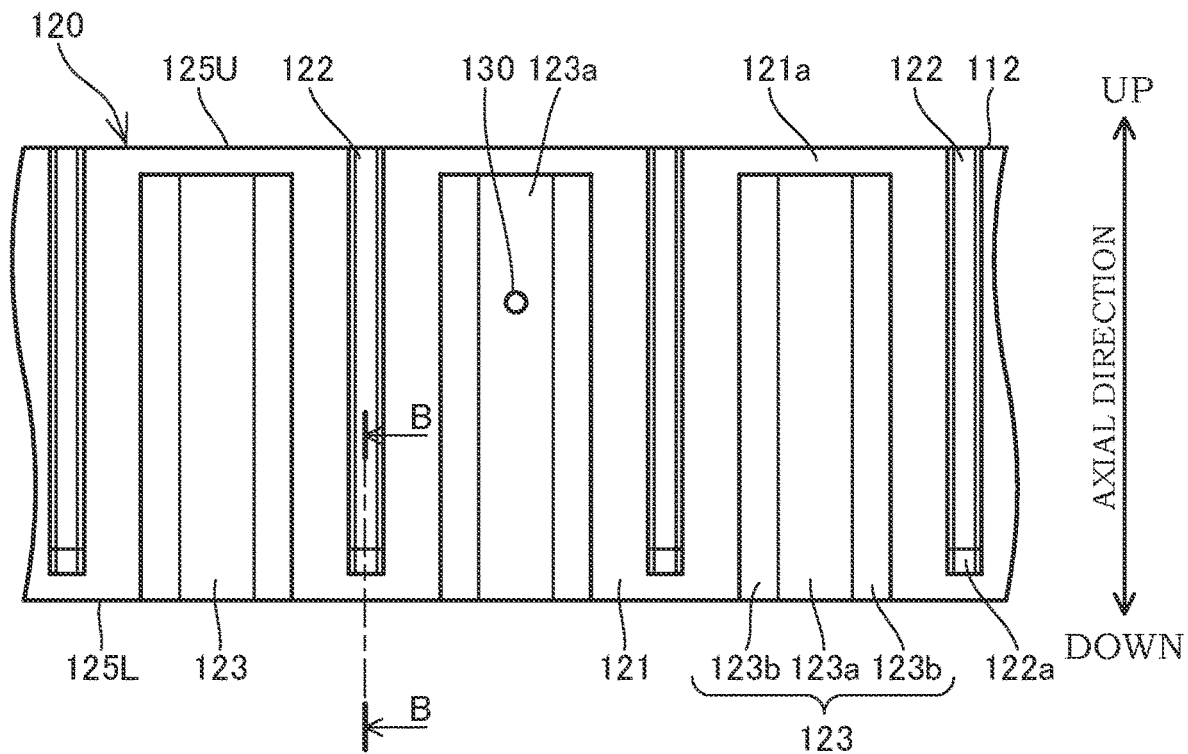
FIG. 4A is an exploded view of the opening portion of the spring guide according to the embodiment of the present invention exploded in the circumferential direction.

As shown in FIG. 2 and FIG. 4A, each of the grooves 123 extends in the axial direction from the lower opening end 125L that is a first opening end of the opening portion 120 in the axial direction to a vicinity of the upper opening end 125U that is a second opening end of the opening portion 120 in the axial direction. That is to say, the grooves 123 serving as the recessed portions are not formed in a region 121a in the inner circumferential surface 121 of the opening portion 120 between the upper opening end 125U and the vicinity of the upper opening end 125U (the position apart from the upper opening end 125U by a predetermined distance). Therefore, compared with a case in which the grooves 123 extend from the lower opening end 125L to the upper opening end 125U of the opening portion 120, it is possible to improve the strength of the spring guide 100.

As shown in FIG. 1, the spring guide 100 is supported by the metallic support ring 3 at the lower end portion of the barrel portion 112 thereof such that a lower end portion of the coil spring 4 is arranged around the hub 113. Therefore, as a load is applied to the spring guide 100 via the coil spring 4, the opening portion 120 is deformed such that the upper opening end 125U is stretched. In this embodiment, the grooves 123 are not formed in the region 121a extending between the upper opening end 125U and the vicinity of the upper opening end 125U. That is to say, an upper opening end portion of the barrel portion 112 has the thickness that is uniform in the circumferential direction. Thus, when the load is applied to the spring guide 100 from the above via the coil spring 4, the deformation causing an expansion of the opening portion 120 is suppressed, and it is possible to suppress a tensile stress.

Figure 4B:
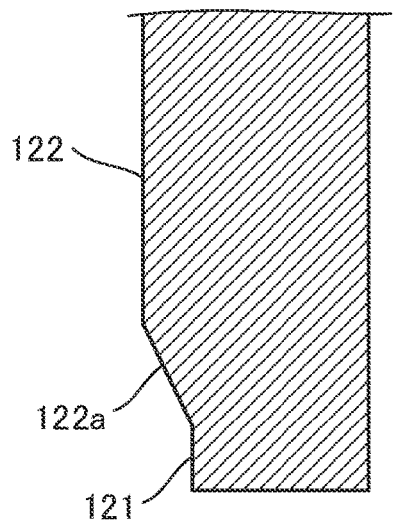
FIG. 4B is a cross-sectional view taken along line B-B in FIG. 4A.

As shown in FIG. 4A, each of the ribs 122 extend in the axial direction from the upper opening end 125U to a vicinity of the lower opening end 125L of the spring guide 100. As shown in FIG. 4B, a guide portion 122a is provided on a lower end portion of each of the ribs 122. The guide portion 122a is inclined such that the protruding height of the rib 122 at a tip end of the guide portion 122a is gradually increased from the lower opening end 125L side towards the upper opening end 125U side.

When the spring guide 100 is to be attached to the cylinder 1b, the cylinder 1b is inserted from the lower opening end 125L of the spring guide 100. Therefore, when the shock absorber 1 is to be inserted into the opening portion 120 of the spring guide 100, the spring guide 100 is moved relatively to the cylinder 1b by the tip ends of the ribs 122 such that the center axis of the opening portion 120 coincides with the center axis of the shock absorber 1. Therefore, the positioning of the spring guide 100 in the radial direction with respect to the cylinder 1b is achieved smoothly.

Figure 3:
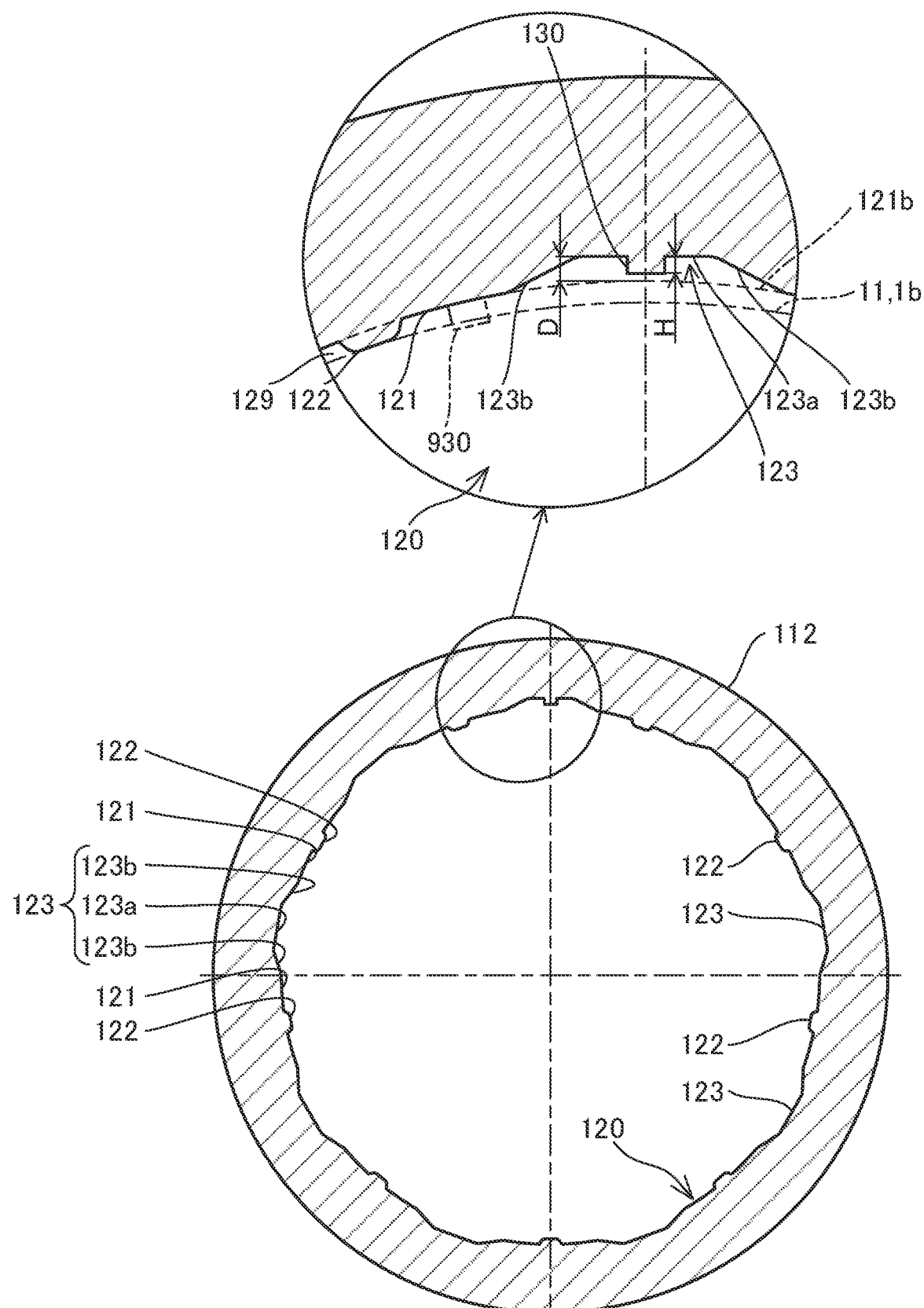
FIG. 3 is a cross-sectional view of an opening portion of the spring guide according to the embodiment of the present invention.

FIG. 3 is a cross-sectional view of the opening portion 120 of the spring guide 100. In FIG. 3, an outer circumferential surface 11 of the cylinder 1b when the spring guide 100 is attached to the cylinder 1b is shown with a two-dot chain line. In addition, in FIG. 3, an imaginary reference plane 121b extending from the inner circumferential surface 121 of the opening portion 120 in the circumferential direction is shown by a broken line.

As shown in FIG. 3, because the cylinder 1b is supported by the ribs 122, a gap 129 is formed between the inner circumferential surface 121 of the opening portion 120 and the outer circumferential surface 11 of the cylinder 1b. If a gate trace (burr) 930 is formed on the inner circumferential surface 121, when the cylinder 1b is inserted into the opening portion 120, there is a risk in that the gate trace 930 comes into contact with the outer circumferential surface 11 of the cylinder 1b. The gate trace 930 may take an irregular shape having projections and depressions on its surface. In addition, due to a deterioration of the injection mold 150 over time, an accuracy of a process of cutting a gate portion is lowered, and in turn, the protruding height of the gate trace 930 may become higher than that can be achieved during an initial usage period of the injection mold 150. Thus, if the gate trace 930 comes into contact with the outer circumferential surface 11 of the cylinder 1b, the insertion of the cylinder 1b into the opening portion 120 is interfered by the gate trace 930, and some extra efforts are required to insert the cylinder 1b into the opening portion 120. In addition, if a tip end of the gate trace 930 comes into contact with the outer circumferential surface 11 of the cylinder 1b, there is a risk in that a coated surface forming the outer circumferential surface 11 of the cylinder 1b is damaged.

In the above, if the protruding height of the ribs 122 is increased (for example, if the protruding height of the ribs 122 is increased so as to be greater than a width of the ribs 122 in the circumferential direction) in order to prevent the gate trace 930 formed on the inner circumferential surface 121 of the opening portion 120 from coming into contact with the outer circumferential surface 11 of the cylinder 1b, a problem in that the ribs 122 are easily buckled in the circumferential direction is caused.

In contrast, in this embodiment, the gate trace 130 of the injection mold 150 (see FIGS. 5 to 7) is formed in the groove 123 serving as a recessed portion that is recessed in the inner circumferential surface 121 of the opening portion 120. By forming the gate trace 130 in the groove 123, a tip end of the gate trace 130 can be positioned radially outward compared with a case in which the gate trace 930 is formed on the inner circumferential surface 121. With such a configuration, when the shock absorber 1 is to be inserted into the opening portion 120 of the spring guide 100, it is possible to prevent the insertion of the shock absorber 1 from being interfered due to the gate trace 130 coming into contact with the outer circumferential surface of the shock absorber 1. That is to say, according to this embodiment, it is possible to improve an insertability of the shock absorber 1 into the opening portion 120 of the spring guide 100.

In addition, in this embodiment, there is no need to increase the protruding height of the ribs 122. For example, there is no need to increase the protruding height of the ribs 122 so as to be greater than the width of the ribs 122 in the circumferential direction. Therefore, it is possible to prevent the ribs 122 from being buckled when the cylinder 1b is inserted into the opening portion 120.

A depth D of the groove 123 is, in other words, the distance from the bottom surface 123a of the groove 123 to the inner circumferential surface 121 (the reference plane 121b) in the radial direction. The depth D of the groove 123 is set such that, in a state before the spring guide 100 is attached to the shock absorber 1, the tip end of the gate trace 130 is not positioned radially inward relative to the position of the outer circumferential surface 11 of the cylinder 1b. That is to say, it suffices that the depth of the groove 123 is set such that, in a state before the spring guide 100 is attached to the shock absorber 1, the tip end of the gate trace 130 is positioned radially outside the tip ends of the ribs 122. With such a configuration, compared with a case in which the tip end of the gate trace 130 is positioned radially inside the tip ends of the ribs 122, it is possible to improve the insertability of the shock absorber 1 into the opening portion 120 of the spring guide 100. In addition, it is possible to prevent the outer circumferential surface (the coated surface) 11 of the shock absorber 1 from being damaged by the tip end of the gate trace 130 coming into contact with the outer circumferential surface 11 of the shock absorber 1.

As shown in the figures, it is preferable that the depth D of the groove 123 be greater than the protruding height H of the gate trace 130, in other words, the distance from the bottom surface 123a of the groove 123 to the tip end of the gate trace 130 in the radial direction. That is to say, it is preferable that the tip end of the gate trace 130 be positioned radially outside the reference plane 121b. With such a configuration, the gate trace 130 does not protrude out from the opening surface of the groove 123 and is entirely received within the groove 123. Because the gate trace 130 is entirely received within the groove 123, it is possible to more effectively prevent the gate trace 130 from coming into contact with the outer circumferential surface of the shock absorber 1 when the shock absorber 1 is inserted into the opening portion 120 of the spring guide 100. According to such a configuration, even if the cylinder 1b is forcedly inserted into the opening portion 120, the gate trace 130 is prevented from coming into contact with the outer circumferential surface 11 of the cylinder 1b.

Next, an example of a method of producing the spring guide 100 will be described. The spring guide 100 is molded in one piece by an injection molding method.

Figure 5:
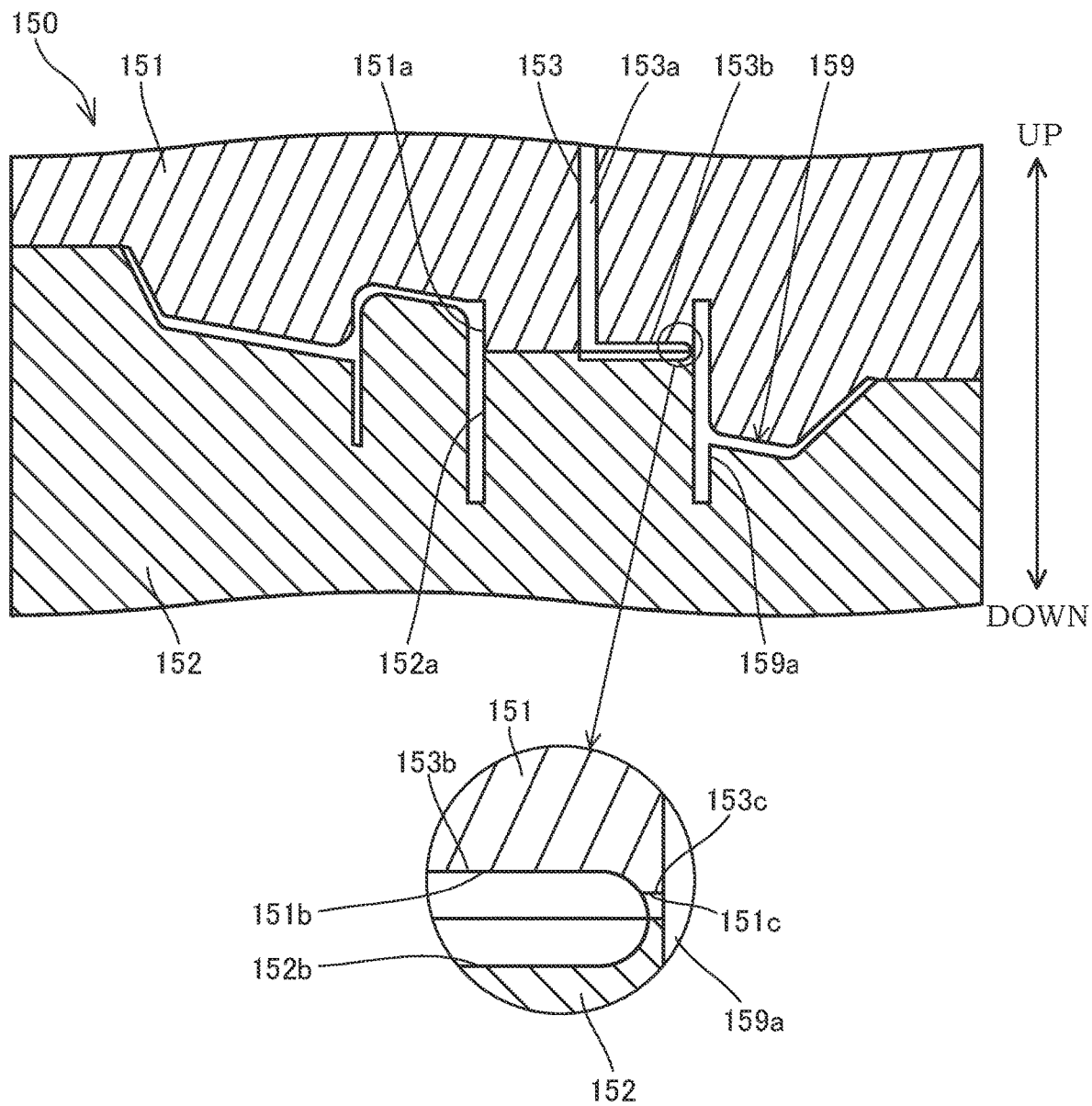
FIG. 5 is a schematic view of a cross-section of an injection mold for explaining a mold positioning step.

A configuration of the injection mold 150 used for the injection molding will be described with reference to FIGS. 5 to 7. The injection mold 150 is provided with a top mold 151 that is a mold on the upper side and a bottom mold 152 that is a mold on the lower side. At least one of the top mold 151 and the bottom mold 152 can be moved upward/downward in the vertical direction. The top mold 151 has an upper column portion 151a for molding the opening portion 120, and the bottom mold 152 has a lower column portion 152a for molding the opening portion 120.

In the injection mold 150, a flow channel 153 through which a resin flows is formed. The flow channel 153 has: a sprue 153a that extends linearly in the vertical direction in the top mold 151; a runner 153b that linearly extends radially outward by being bent by 90 degree from a lower end of the sprue 153a; and a gate 153c that communicates with a resin filling portion 159a for molding the barrel portion 112 by extending from a tip end of the runner 153b. The gate 153c is set so as to be positioned in the bottom surface 123a of the groove 123 of the opening portion 120 of the spring guide 100 that is to be molded. A flow-channel cross-sectional area of the gate 153c is smaller than a flow-channel cross-sectional area of the runner 153b.

The runner 153b is defined by a runner groove 151b of the top mold 151 and a runner groove 152b of the bottom mold 152. The gate 153c is defined by a gate groove 151c of the top mold 151 and a flat end surface of the lower column portion 152a of the bottom mold 152.

The method of producing the spring guide 100 includes a mold positioning step, a resin filling step, a curing step, and a mold separating step. As shown in FIG. 5, in the mold positioning step, a resin filling space 159 is formed by positioning the top mold 151 and the bottom mold 152. When the mold positioning step is finished, the resin filling step is performed.

Figure 6:
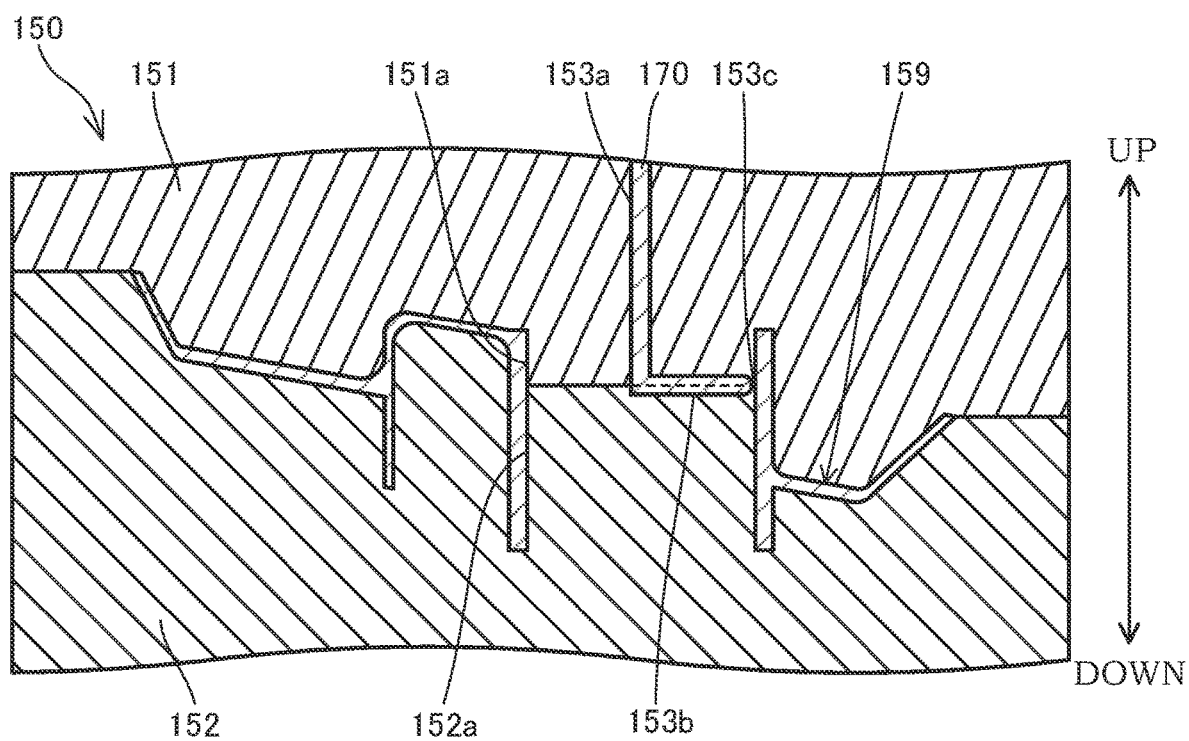
FIG. 6 is a schematic view of a cross-section of the injection mold for explaining a resin filling step and a curing step.

As shown in FIG. 6, in the resin filling step, a molten resin 170 is charged into the resin filling space 159 through the sprue 153a, the runner 153b, and the gate 153c to fill the resin filling space 159 with the resin 170. When the resin filling step is finished, the curing step is performed. In the curing step, heat is removed from the injection mold 150 to cool the resin 170, and thereby, the resin 170 is allowed to be cured. When the curing step is finished, the mold separating step is performed.

Figure 7:
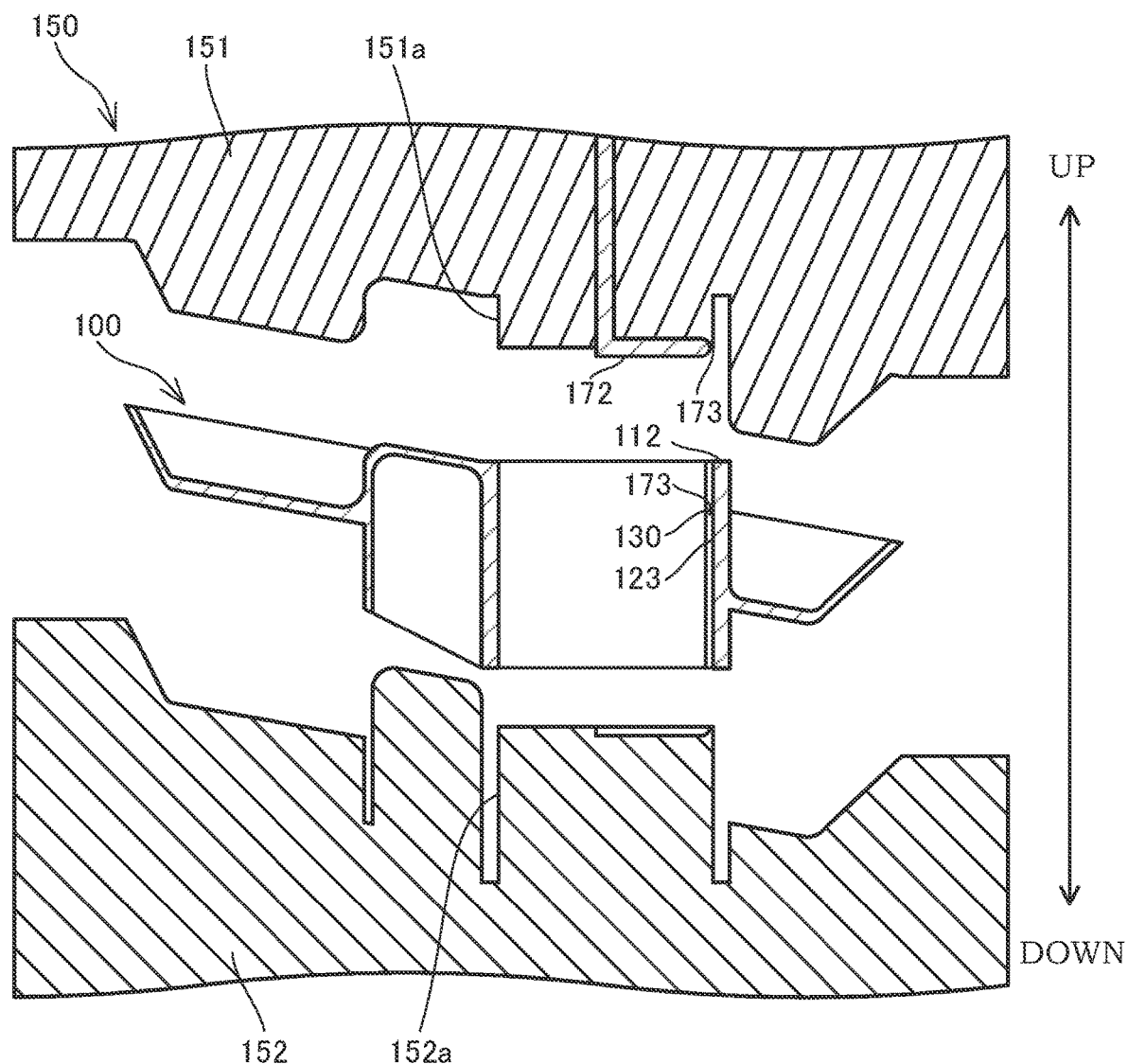
FIG. 7 is a schematic view of a cross-section of the injection mold for explaining a mold separating step.

As shown in FIG. 7, in the mold separating step, the top mold 151 or the bottom mold 152 is moved such that the top mold 151 and the bottom mold 152 are separated from each other. By separating the top mold 151 and the bottom mold 152, a gate portion 173 having a smaller cross-sectional area than a runner portion 172 is cut off. By cutting the gate portion 173 off, the gate trace (the burr) 130, which is a remaining of the gate portion 173, is formed on the spring guide 100. The gate portion 173 may not be cut by the separation of the injection mold 150, and the gate portion 173 may be cut by a tool such as a nipper. Also in this case, the gate trace 130 is formed on the spring guide 100. Because the gate trace 130 is formed at the bottom surface 123a of the groove 123 of the opening portion 120 (see FIG. 3), it is possible to omit a process of removing the gate trace 130. As described above, the spring guide 100 is completed.

In this embodiment, the grooves 123 are formed so as to extend in the axial direction from the first opening end (the lower opening end 125L) of the opening portion 120 in the axial direction, and the ribs 122 are formed so as to extend in the axial direction from the second opening end (the upper opening end 125U) in the axial direction of the opening portion 120. With such a configuration, there is no need to provide a slide core, etc., and the injection mold 150 can be made to have a simple configuration, and therefore, it is possible to achieve reduction in a production cost.

According to the above-described embodiment, following operational advantages are afforded.

In the spring guide 100 formed by the injection molding, the gate trace 130 of the injection mold 150 is formed in a the groove 123 serving as the recessed portion that is recessed in the inner circumferential surface of the opening portion 120. With such a configuration, when the shock absorber 1 is to be inserted into the opening portion 120 of the spring guide 100, it is possible to prevent the insertion of the shock absorber 1 from being interfered due to the gate trace 130 coming into contact with the outer circumferential surface of the shock absorber 1. That is to say, it is possible to improve the insertability of the shock absorber 1 into the opening portion 120 of the spring guide 100. Therefore, according to this embodiment, it is possible to provide the suspension device 10 in which the insertability of the shock absorber 1 into the opening portion 120 of the spring guide 100 is improved.

The following modifications are also within the scope of the present invention, and it is also possible to combine the configurations shown in the modification with the configurations described in the above embodiment, or to combine the configurations described in the following different modifications.

<First Modification>

In the above-mentioned embodiment, a description is given of an example in which a plurality of grooves 123 are provided, and the gate trace 130 is formed in one of the grooves 123. However, the present invention is not limited thereto. In a case in which a plurality of runners 153b and gates 153c are provided, a plurality of gate traces 130 are also formed in the spring guide 100. In this case, it suffices that the gates 153c are set such that all of the gate traces 130 are respectively formed in the grooves 123.

<Second Modification>

In the above-mentioned embodiment, a description is given of an example in which a plurality of grooves 123 are provided. However, the present invention is not limited thereto. For example, when there is only one gate 153c of the injection mold 150, a single groove 123, in which the gate trace 130 is to be formed, may be formed.

<Third Modification>

Figure 8:
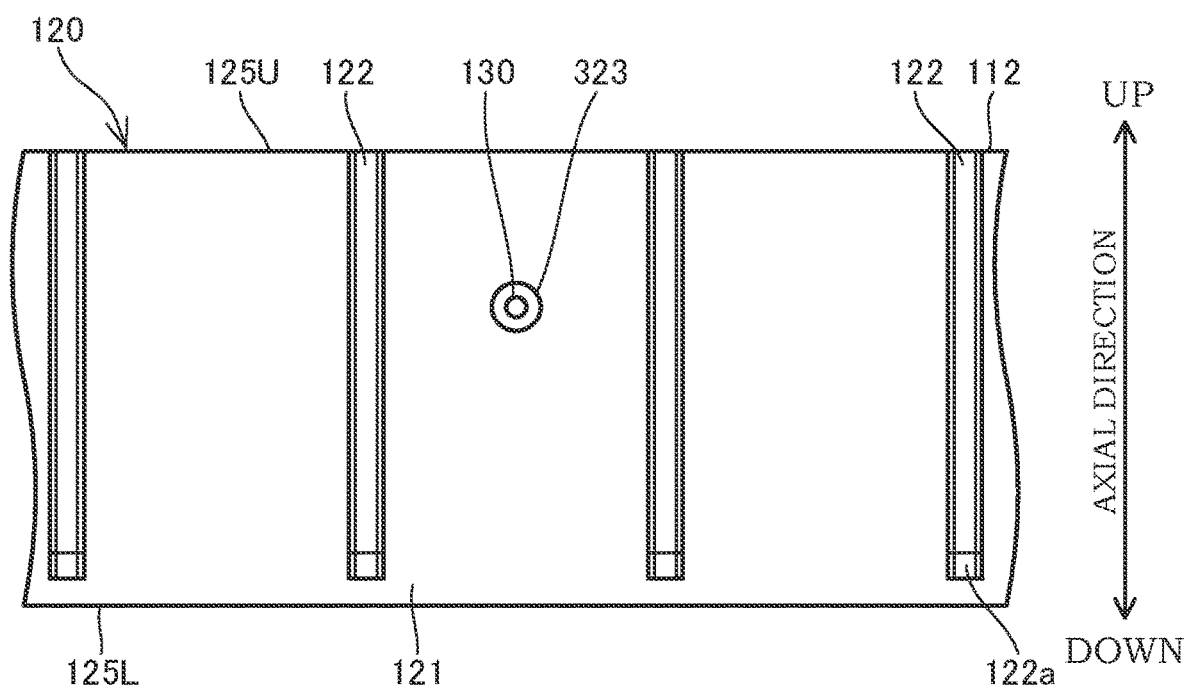
FIG. 8 is an exploded view of the opening portion of the spring guide according to a third modification of the embodiment of the present invention exploded in the circumferential direction.

In the above-mentioned embodiment, a description is given of an example in which the recessed portion, in which the gate trace 130 is formed, is the groove 123 that extends in the axial direction from the first opening end of the shock absorber 1 in the axial direction (see FIG. 4A). However, the present invention is not limited thereto. As shown in FIG. 8, for example, instead of providing the groove 123, it may be possible to provide a circular recessed portion 323 in which the gate trace 130 is to be arranged. The circular recessed portion 323 may be formed by providing a slide core, etc. to the injection mold 150. In a case in which the recessed portions (the grooves 123) are formed so as to extend in the axial direction from the first opening end in the axial direction as in the above-mentioned embodiment, the slide core is not required, and so, the injection mold 150 can be made to have a simple configuration, and therefore, it is possible to achieve reduction in a production cost.

<Fourth Modification>

Figure 9:
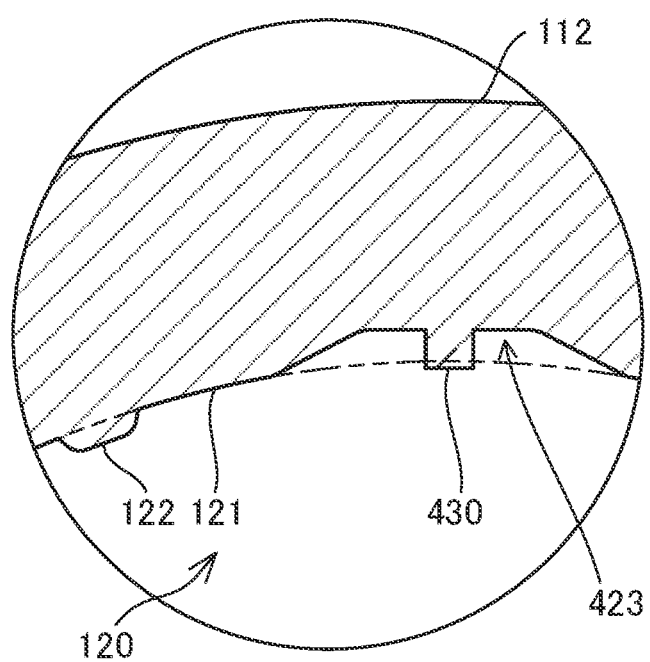
FIG. 9 is an enlarged cross-sectional view of the opening portion showing a gate trace projecting out from a groove of the spring guide according to a fourth modification of the embodiment of the present invention.

In the above-mentioned embodiment, a description is given of an example in which the depth D of the groove 123 is greater than the protruding height H of the gate trace 130 (see FIG. 3). However, the present invention is not limited thereto. As shown in FIG. 9, the depth of a groove 423 may be smaller than the protruding height of a gate trace 430. However, in this case, in a state before the spring guide 100 is attached to the shock absorber 1, it is preferable that a tip end of the gate trace 430 be positioned radially outside the tip ends of the ribs 122. According to such a configuration, when the cylinder 1b is attached by employing "the clearance fit" with respect to the ribs 122, it is possible to prevent the gate trace 430 from coming into contact with the cylinder 1b.

<Fifth Modification>

The shape of the gate 153c when the spring guide 100 is molded is not limited to that in the above-mentioned embodiments, and it is possible to employ various shapes. For example, it may be possible to provide a direct gate that extends linearly from the oblique direction and to arrange a tip end of the direct gate in the bottom surface 123a of the groove 123. In addition, it may be possible to form an arc-shaped banana gate so as to extend from the runner 153b and to arrange a tip end of the banana gate in the bottom surface 123a of the groove 123. It may be possible to form a cone-shaped submarine gate so as to extend from the runner 153b and to arrange a tip end of the submarine gate in the bottom surfaces 123a of the groove 123.

<Sixth Modification>

The cross-sectional shape of the rib 122 is not limited to those in the above-mentioned embodiments. It is possible to employ various shapes as the cross-sectional shape of the rib 122. For example, the cross-sectional shape of the rib 122 may be a triangle and a rectangle, such as an oblong. In addition, corner portions of the rib 122 may or may not be rounded.

The configurations, operations, and effects of the embodiments of the present invention configured as described above will be collectively described.

The spring guide 100 is the spring guide 100 attached to the outer circumferential surface of the shock absorber 1 provided between the vehicle body and the wheel and configured to support the coil spring 4 for elastically supporting the vehicle body, the spring guide 100 including: the base portion 110 configured to support the coil spring 4; and the opening portion 120 provided so as to penetrate through the base portion 110, the opening portion 120 being configured such that the shock absorber 1 is inserted into the opening portion 120, wherein the opening portion 120 is provided with: the ribs 122 serving as the protruded portions protruding out from the inner circumferential surface 121 of the opening portion 120, the ribs 122 being configured to support the shock absorber 1; and a recessed portion (the grooves 123, the recessed portion 323, the groove 423) recessed in the inner circumferential surface 121 of the opening portion 120, the plurality of the ribs 122 are arranged along the circumferential direction of the opening portion 120, and the gate trace 130, 430 of the injection mold 150 is formed in the recessed portion (the grooves 123, the recessed portion 323, the groove 423).

With such a configuration, because the gate trace 130, 430 is formed in the recessed portion (the grooves 123, the recessed portion 323, the groove 423) that is recessed in the inner circumferential surface 121 of the opening portion 120, when the shock absorber 1 is to be inserted into the opening portion 120 of the spring guide 100, it is possible to prevent the insertion of the shock absorber 1 from being interfered due to the gate trace 130, 430 coming into contact with the outer circumferential surface of the shock absorber 1. That is to say, it is possible to improve the insertability of the shock absorber 1 into the opening portion 120 of the spring guide 100.

In the spring guide 100, the tip end of the gate trace 130, 430 is positioned radially outside the tip ends of the ribs 122.

With such a configuration, compared with a case in which the tip end of the gate trace 130, 430 is positioned radially inside the tip ends of the ribs 122, it is possible to improve the insertability of the shock absorber 1 into the opening portion 120 of the spring guide 100. In addition, it is possible to prevent the outer circumferential surface 11 of the shock absorber 1 from being damaged by the tip end of the gate trace 130, 430 coming into contact with the outer circumferential surface 11 of the shock absorber 1.

In the spring guide 100, the depth D of the recessed portion (the grooves 123, the recessed portion 323, the groove 423) is greater than the protruding height H of the gate trace 130, 430.

With such a configuration, because the gate trace is entirely received within the recessed portion (the grooves 123, the recessed portion 323, the groove 423), it is possible to more effectively prevent the gate trace 130, 430 from coming into contact with the outer circumferential surface of the shock absorber 1 when the shock absorber 1 is inserted into the opening portion 120 of the spring guide 100.

In the spring guide 100, the groove 123, 423 serving as the recessed portion extends in the axial direction from the first opening end (the lower opening end 125L) of the opening portion 120, into which the shock absorber 1 is inserted, in the axial direction.

With such a configuration, it is possible to make the injection mold 150 to have a simple configuration.

In the spring guide 100, the groove 123, 423 serving as the recessed portion extends from the first opening end (the lower opening end 125L) of the opening portion 120 in the axial direction to the vicinity of the second opening end (the upper opening end 125U) in the axial direction, and the groove 123, 423 serving as the recessed portion is not formed in the region 121a in the inner circumferential surface 121 of the opening portion 120 between the second opening end (the upper opening end 125U) in the axial direction and the vicinity of the second opening end (the upper opening end 125U) in the axial direction.

With such a configuration, compared with a case in which the recessed portion extends from the first opening end (the lower opening end 125L) of the opening portion 120 in the axial direction to the second opening end (the upper opening end 125U) in the axial direction, it is possible to improve the strength of the spring guide 100.

In the spring guide 100, the plurality of the recessed portions (the grooves 123, the grooves 423) are arranged at equal intervals along the circumferential direction of the opening portion 120.

With such a configuration, compared with a case in which a single recessed portion is provided, it is possible to reduce the weight of the spring guide 100 and to achieve the balanced strength in the circumferential direction.

In the spring guide 100, the tip ends of the ribs 122 are inclined such that the protruding height of the ribs 122 is gradually increased from the first opening end (the lower opening end 125L) side in the axial direction towards the second opening end (the upper opening end 125U) side in the axial direction, the shock absorber 1 being inserted from the first opening end (the lower opening end 125L) side.

With such a configuration, when the shock absorber 1 is to be inserted into the opening portion 120 of the spring guide 100, an alignment of the spring guide 100 with respect to the shock absorber 1 in the radial direction can be achieved smoothly by the tip ends of the ribs 122.

The suspension device 10 is provided with: the spring guide 100; the shock absorber 1; the upper mount 2 attached to the tip end of the rod 1a of the shock absorber 1; and the coil spring 4 provided between the spring guide 100 and the upper mount 2.

With such a configuration, it is possible to provide the suspension device 10 in which the insertability of the shock absorber 1 into the opening portion 120 of the spring guide 100 is improved.

Although the embodiments of the present invention have been described above, the above-mentioned embodiments are merely illustrations of parts of application examples of the present invention, and there is no intention to limit the technical scope of the present invention to the specific configuration of the above-mentioned embodiments.

The present application claims a priority based on Japanese Patent Application No. 2018-235807 filed on Dec. 17, 2018 before the Japan Patent Office, the entire contents of which are incorporated herein by reference.

The invention claimed is:

1. A spring guide attached to an outer circumferential surface of a shock absorber provided between a vehicle body and a wheel and configured to support a coil spring for elastically supporting the vehicle body, the spring guide comprising:
    a base portion configured to support the coil spring; and
    an opening portion provided so as to penetrate through the base portion, the opening portion being configured such that the shock absorber is inserted into the opening portion, wherein
    the opening portion is provided with: protruded portions protruding out from an inner circumferential surface of the opening portion, the protruded portions being configured to support the shock absorber; and a recessed portion recessed in the inner circumferential surface of the opening portion,
    a plurality of the protruded portions are arranged along a circumferential direction of the opening portion, and
    a gate trace of an injection mold is formed in the recessed portion.

2. The spring guide according to claim 1, wherein a tip end of the gate trace is positioned radially outside tip ends of the protruded portions.

3. The spring guide according to claim 2, wherein a depth of the recessed portion is greater than a protruding height of the gate trace.

4. The spring guide according to claim 1, wherein the recessed portion extends in an axial direction from a first opening end of the opening portion, into which the shock absorber is inserted, in the axial direction.

5. The spring guide according to claim 4, wherein the recessed portion extends from the first opening end of the opening portion in the axial direction to a vicinity of a second opening end of the opening portion in the axial direction, and
    the recessed portion is not formed in a region in the inner circumferential surface of the opening portion between the second opening end in the axial direction and the vicinity of the second opening end in the axial direction.

6. The spring guide according to claim 1, wherein a plurality of the recessed portions are arranged at equal intervals along the circumferential direction of the opening portion.

7. The spring guide according to claim 1, wherein the tip ends of the protruded portions are inclined such that a protruding height of the protruded portions is gradually increased from the first opening end side in the axial direction towards the second opening end side in the axial direction, the shock absorber being inserted from the first opening end side.

8. A suspension device comprising:
    a spring guide according to claim 1;
    the shock absorber;
    an upper mount attached to a tip end of a rod of the shock absorber; and
    the coil spring provided between the spring guide and the upper mount.

* * * * *